(No Model.) 6 Sheets—Sheet 1.

F. M. PENNOCK & G. WEBSTER.
ROAD SCRAPING MACHINE.

No. 544,320. Patented Aug. 13, 1895.

Witnesses:
R. Schleicher
F. L. Goodwin

Inventors
Frederick M. Pennock
& Guy Webster
by their Attorneys
Howson & Howson (No Model.) 6 Sheets—Sheet 2.

F. M. PENNOCK & G. WEBSTER.
ROAD SCRAPING MACHINE.

No. 544,320. Patented Aug. 13, 1895.

Witnesses:
R. Schleicher
F. D. Goodwin

Inventors
Frederick M. Pennock
& Guy Webster
by their Attorneys
Howson & Howson (No Model.) 6 Sheets—Sheet 3.
F. M. PENNOCK & G. WEBSTER.
ROAD SCRAPING MACHINE.
No. 544,320. Patented Aug. 13, 1895.
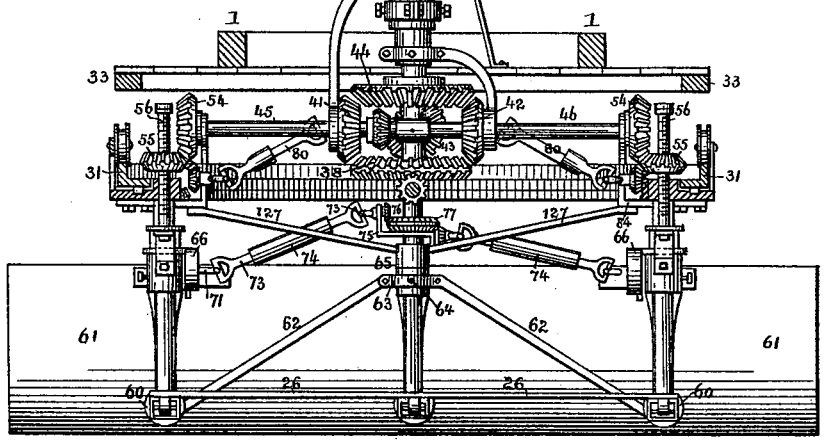
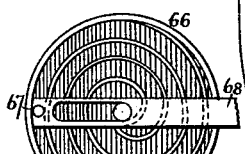
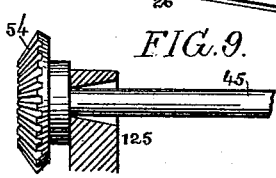
Witnesses:
R. Schleicher
F. R. Goodwin
Inventors
Frederick M. Pennock
& Guy Webster
by their Attorneys
Howson & Howson (No Model.) 6 Sheets—Sheet 4.
F. M. PENNOCK & G. WEBSTER.
ROAD SCRAPING MACHINE.
No. 544,320. Patented Aug. 13, 1895.
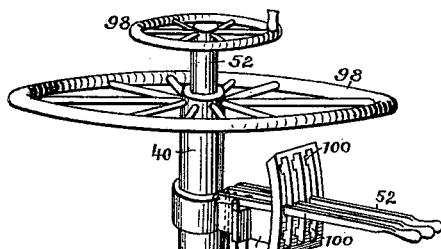
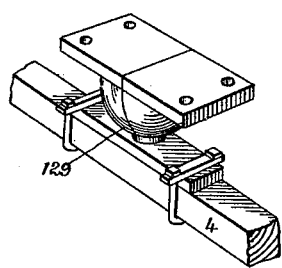
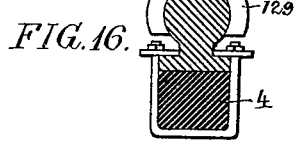
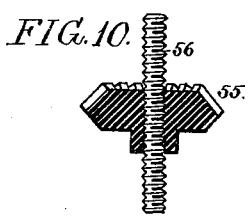
Witnesses:
R. Schlicher
F. L. Goodwin
Inventors:
Frederick M. Pennock
& Guy Webster
by their Attorneys
Howson & Howson (No Model.) 6 Sheets—Sheet 5.

F. M. PENNOCK & G. WEBSTER.
ROAD SCRAPING MACHINE.

No. 544,320. Patented Aug. 13, 1895.

Witnesses:
R. Schleicher
F. D. Goodwin

Inventors:
Frederick M. Pennock &
Guy Webster
by their Attorneys
Howson & Howson (No Model.) 6 Sheets—Sheet 6.

F. M. PENNOCK & G. WEBSTER.
ROAD SCRAPING MACHINE.

No. 544,320. Patented Aug. 13, 1895.

Witnesses:
R. Schleicher
G. R. Goodwin

Inventors.
Frederick M. Pennock
& Guy Webster:
by their Attorneys
Howson & Howson

UNITED STATES PATENT OFFICE.

FREDERICK M. PENNOCK AND GUY WEBSTER, OF CHARLESTOWN, WEST VIRGINIA.

ROAD-SCRAPING MACHINE.

SPECIFICATION forming part of Letters Patent No. 544,320, dated August 13, 1895.

Application filed July 2, 1892. Serial No. 438,782. (No model.)

*To all whom it may concern:*

Be it known that we, FREDERICK M. PENNOCK and GUY WEBSTER, citizens of the United States, residing at Charlestown, Jefferson county, West Virginia, have invented certain Improvements in Road-Scraping Machines, of which the following is a specification.

One object of our invention is to provide for effecting various movements of the scraping or plowing blade of a road scraping or ditching machine by means of power instead of by hand, provision being also made for operating the blade by hand when power is not available.

A further object of the invention is to readily change the gage of the rear wheels and their lateral position in respect to the fixed frame, and still further objects are to provide an automatic and equalized draft for the machine, to use a wide frame without interfering with the adjustment of the scraping-blade to an acute angle, to provide a direct vertical lift for the blade in all positions of horizontal angular adjustment, and to operate the adjusting devices from a common center on the machine.

These objects we attain in the manner hereinafter set forth, reference being had to the accompanying drawings, in which—

Figure 1:
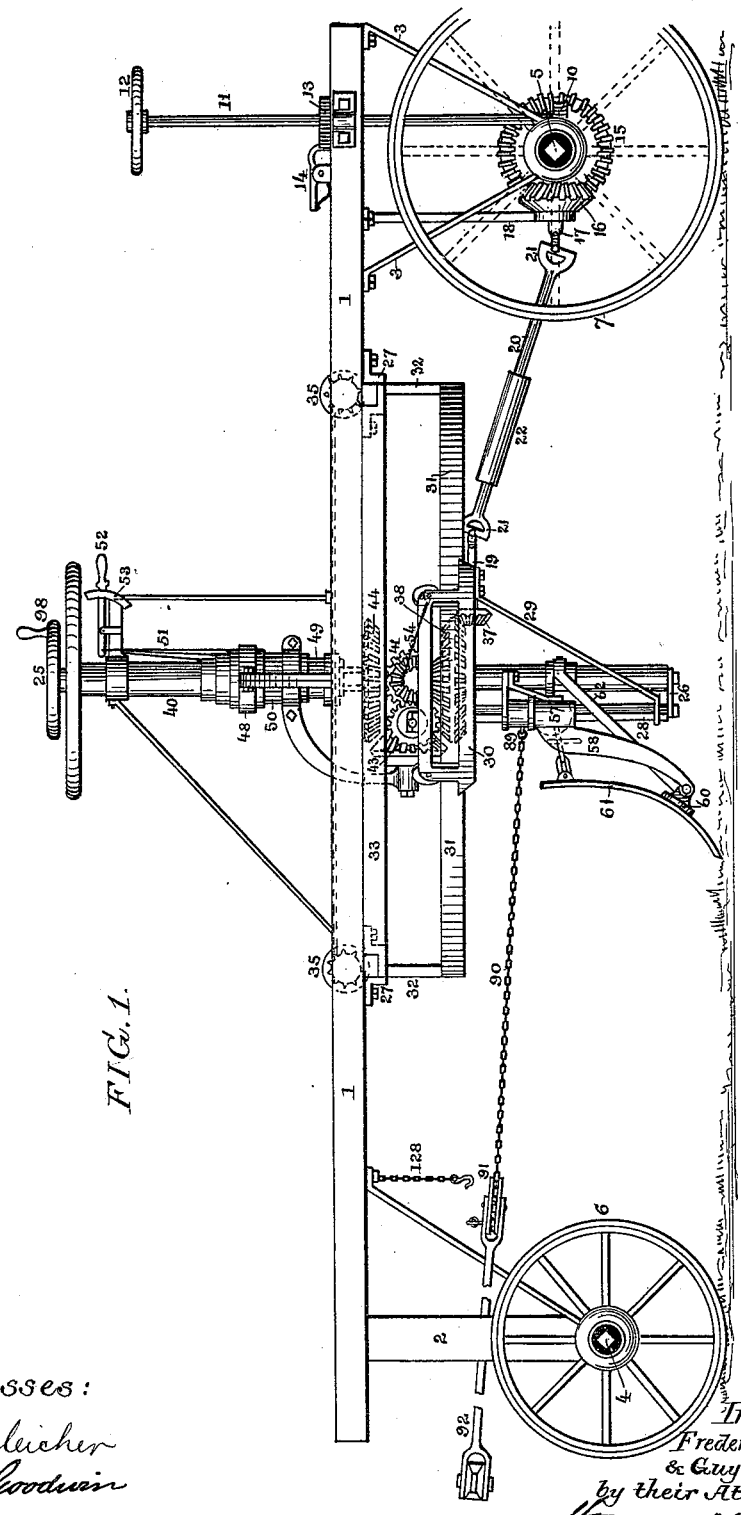
Figure 2:
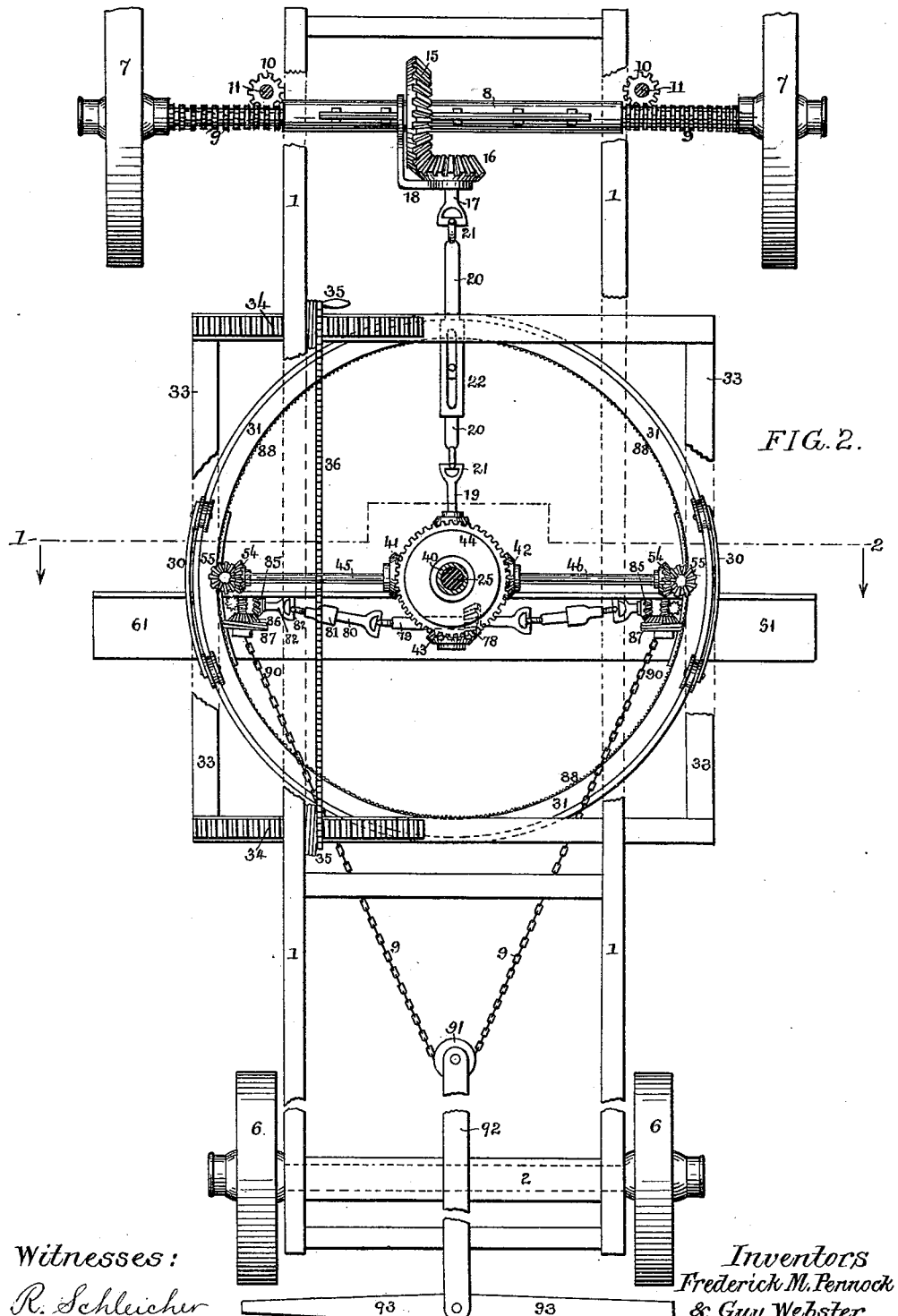
Figure 7:
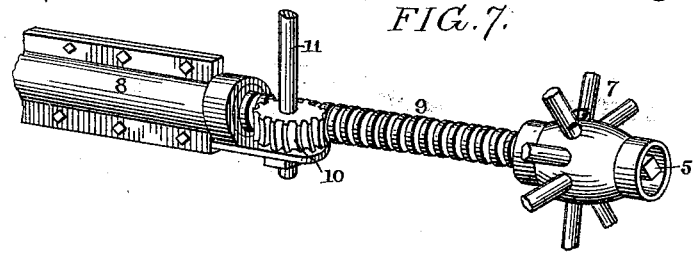

Figure 1 represents a side view of a road scraping or ditching machine constructed in accordance with our invention. Fig. 2 is a plan view of the same, partly in section, and with part of the fixed frame broken away in order to show the parts beneath. Fig. 3 is a transverse section of the machine on the line 1 2, Fig. 2. Figs. 4 and 5 are enlarged perspective views of parts of the blade-adjusting mechanism of the machine. Figs. 6 to 17, inclusive, are detached views of various details of the machine; and Figs. 18 to 22, inclusive, are views illustrating modifications of some of the details of the machine.

The fixed frame 1 of the machine is provided with depending frames 2 and 3, each forming bearings, respectively, for the front and rear axles 4 and 5 of the machine, these axles being provided with suitable wheels 6 and 7. The rear axle is composed of three sections—namely, the central section 8 and the two outer sections 9, the latter carrying the rear wheels 7 and being free to move transversely in the central section 8, but being connected by means of spring-pins 102, carried by said sections 9 and adapted to bear against a shoulder in the central section, so that the latter is caused to turn with the wheels when the latter move forward, but is free from their control on the backward movement. (See Fig. 6.)

Various means may be adopted for laterally shifting the outer sections 9 9 of the rear axle in respect to the central section 8, so as to change the gage of the rear wheels or shift their position laterally in respect to the fixed frame. In the present instance these sections 9 9 are provided with annular ribs, forming racks, with each of which engages a pinion 10 on a vertical shaft 11, Fig. 7, having at the top a suitable hand-wheel 12, by which it may be manipulated, so as to shift the outer sections of the axle laterally in or out, a notched disk 13 and a detent 14 serving to hold the shaft in any position to which it may be adjusted.

On the central section 8 of the rear axle is a bevel-wheel 15, which engages with a bevel-pinion 16 on a shaft 17, the latter being free to turn in a hanger 18 and being coupled to a shaft 19 by means of an interposed shaft 20, having at each end a universal or gimbal joint 21 and an intermediate extensible section 22. (See Fig. 1.) The shaft 19 is adapted to a bearing in a bracket 23, projecting from a sleeve 24, supported vertically on, but free from connection with, a central vertical axial shaft 25, the lower end of which is stepped in a brace-bar 26, connecting the lower ends of opposite side posts 28, Figs. 1, 3, and 4, brace-rods 29 connecting said posts to a carriage 30, which embraces and is free to travel upon a ring 31, suspended by hangers 32 from a supplementary frame 33 mounted in hangers 27 on the fixed frame 1, so as to be free to move laterally in respect to said fixed frame, suitable racks 34 on said frame 33 engaging with worms 35, connected by a chain belt 36, so that by turning one of the wheels in one direction or the other the other will be likewise operated and the frame 33 shifted laterally to right or left. (See Figs. 2 and 8.) The shaft 19 has a bevel-pinion 37, which gears into the under face of a double bevel-wheel 38 carried by a tubular shaft 40, which is free to turn on the central axial shaft 25, and which we term the "primary shaft" of the blade-adjusting mechanism, the double bevel-wheel 38 having an upper face with which may be thrown into gear either of the three bevel-pinions 41, 42, or 43. (See Fig. 5.)

Secured to the tubular shaft 40 directly above the bevel-wheel 38 is a bevel-wheel 44, with which also the bevel-pinions 41 42 43 may be thrown into gear, the two bevel-wheels being so located in respect to each other that when either of the pinions is dropped into engagement with the lower bevel-wheel it will be free from engagement with the upper bevel-wheel, and when lifted into engagement with the latter will be free from engagement with the lower bevel-wheel, or when in an intermediate position will be free from both. The upper and lower bevel-wheels are turned in the same direction, and it follows that when a pinion is in gear with the lower bevel-wheel it will be rotated in a direction the reverse of its movement when meshing into the upper bevel-wheel, and the shafts 45 and 46 and pivoted arm 47, carrying respectively the bevel-wheels 41, 42, and 43, are controlled respectively by vertically-moving slides 48, 49, and 50, each connected by a rod 51 to an operating-lever 52, carried by a bracket 53 mounted on a loose collar on the shaft 40, so that either of the bevel-pinions may be readily thrown into engagement with either the upper or lower bevel-wheel, depending upon the direction on which it is desired to turn said pinion.

The shafts 45 and 46 serve to operate the mechanism whereby the vertical adjustment of the opposite ends of the scraping or plowing blade is effected, and as this mechanism is precisely the same at each end of the blade a description of the mechanism at one end will suffice, and the same is true also of the mechanism for imparting the horizontal angular adjustment to the blade and of the mechanism for imparting the pitch adjustment thereto.

Figure 11:
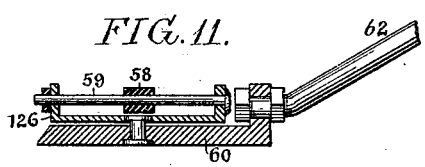

Taking for illustration the shaft 45, it will be seen on reference to Figs. 2, 3, 4, and 9 that it is adapted to a conical bearing in a bracket 125 on the carriage 30 and has at the outer end a bevel-wheel 54, meshing into a bevel-pinion 55, which rests upon a projecting lug on the carriage 30, the hub of this pinion forming a nut, Fig. 10, for the reception of a screw-rod 56, which is adapted to a bearing in the lug on the carriage and carries at its lower end brackets 39 supporting a slide 57, which is bored out to receive a drum 94, referred to hereinafter, this drum being mounted upon, but free to move vertically on one of the vertical bars 28 of the draft-frame of the machine, the slide having a depending arm 58, to the lower end of which is adapted a rod 59, free to slide laterally through the arm, and carried by a bracket 126, Fig. 11, pivoted to a boss 60, secured to the rear of the scraping or plowing blade 61, this boss being connected by a rod 62 to a ring 63 hung by longitudinal pivot-pins 64 to a sleeve 65 mounted vertically on, but so as to be free from turning with the central axial shaft 25, these rods 62 thus serving as braces for the plowing-blade, while other rods 127, extending from brackets 84 on the frame to the sleeve 65, serve as braces for the said frame 30, the whole forming an X-shaped frame, which rigidly braces the blade in its horizontal angular adjustment and insures the desired stiffness of the outer ends of the blade. The rods 59 serve as pivots, on which the blade can swing in effecting its pitch adjustment, these rods sliding longitudinally through the lower ends of the depending hanger-arms 58, as is rendered necessary by the arc of a circle in which the end of the blade moves when one end is adjusted to a higher or lower position than the opposite end. This vertical adjustment of the end of the blade is effected, as will be evident, by turning in one direction or the other the shaft 45, thus effecting a corresponding movement of the pinion 55 and a rise and fall of the screw-rod 56, and with it the slide 57 and hanger 58. The pitch adjustment of the blade 61 is effected, as shown in Figs. 4, 12, and 13, by means of a snail 66 acting on a pin 67 projecting from a guided bar 68, the front end of which is forked and embraces a rod 69 carried by a frame 70 on the back of the blade near the upper edge of the same, this rod being of such length as to insure the necessary play to the bar 69, due to the longitudinal movements of the blade in effecting the various end adjustments of the same.

The snail 66 is carried by a shaft 71, the inner end of which is connected by a universal or gimbal joint 72 to a shaft 73 having an extensible section 74 adapted at its outer end to a bearing in a bracket 75 projecting from the central axial shaft 25, said upper end of the shaft 73 having a bevel-pinion 76, which meshes with one face of a double bevel-wheel 77 secured to and turning with said central shaft 25. The snail 66 thus not only serves to swing the upper portion of the blade 61 forward or rearward, but also provides for the secure locking of said blade in either of the positions to which it may be adjusted.

The circumferential swinging of the blade, or, as it is termed, the "horizontal angular adjustment," is derived from the pinion 43, which meshes into a pinion 78 on a shaft 79, the outer end of the latter being connected, by means of a shaft 80 having an extensible section 81 and universal or gimbal joints 82, to a short shaft 83, which is adapted to a bearing in the bracket 84 on the carriage 30 and is provided with a bevel-pinion 85, gearing into a bevel-wheel 86 secured to or forming part of a worm-wheel 87, which meshes into an annular worm 88 formed on the inner edge of the ring 31, so that by turning the worm in one direction or the other the carriage 30, and with it the draft-frame and scraping-blade, will be caused to traverse said ring, the movement being either forward or backward, depending upon the direction of rotation of the worm-wheel. The shafts 25 and 40 thus form a compound axial shaft, driven from one of the carrying wheels or axles of the machine and serving to impart all the necessary movements of adjustment to the scraping-blade.

Draft is imparted to the draft-frame by means of the chain 90, which passes around a pulley 91 on a draft-bar 92 having a doubletree 93, each end of this chain being connected to a drum 94, which turns in the slide 57, as shown in Fig. 4, and has a polygonal opening for the reception of one of the polygonal bars 28 of the draft-frame, these bars, it will be understood, being so mounted in a bearing 95 on the carriage 30, and in the lower ends of the brace-bars 29 and the bars 26 that they are free to turn in said bearings. The upper end of each bar 28 forms a worm-wheel 96, which engages with the threaded shaft 97 of the worm-wheel 87, this shaft being adapted to a bearing in an arm of the bracket 84, so that as the shaft is turned to swing the end of the plowing-blade forward the drum 94 will also be turned so as to take up the slack of the chain thus produced, the drum being turned so as to deliver the slack when the end of the blade is moved rearward. The slide 57 is prevented from turning with the drum 94 by reason of the restraining influence of the bracket 39 and of the depending arm 58 connected to the scraper-blade.

The draft-bar 92 is normally free from confinement both vertically and laterally, so that it automatically adjusts itself to the actual line of draft, which, when the machine is at work, is constantly varying in accordance with the adjustment of the scraper-blade and difference in the character of the work done. Chains 128 are, however, provided for limiting the side movement of the draft-bar when the blade is working into a roadside-ditch into which it is not desired to drive the team, and in doing which class of work the freely-swinging draft-bar would be objectionable.

The front axle is connected by a ball-and-socket joint 129 to the front frame or hanger 2 so as to permit the necessary winging movements of the axle for turning and to accommodate the inequalities in the ground.

It will be observed that the power necessary to effect the horizontal angular adjustment and the vertical end adjustment of the plowing or scraping blade is derived directly from the running-gear of the machine, the attendant having to shift the levers 52 which govern the operation of various devices, so that the actual labor of the attendant in charge of the machine is reduced to a minimum. In order, however, that the parts may be adjusted by hand in case of any derangement of the power, the upper end of the primary shaft 40 is provided with a hand-wheel 98 for manipulation by the attendant, a similar hand-wheel on the axial shaft 25 providing for the movement of said shaft to actuate the pitch-adjusting devices.

The bracket 53, which carries the operating-levers 52, has locking-segments with intermediate and upper and lower locking-notches 100, and each operating-lever 52 is preferably acted upon by springs 101 above and below the same, these springs tending to maintain the lever in the intermediate or inoperative position, as shown in Fig. 17—that is to say, in such position that it holds the pinions 41, 42, and 43 in position midway between the upper and lower bevel-wheels and free from engagement with either of the same.

Figure 18:
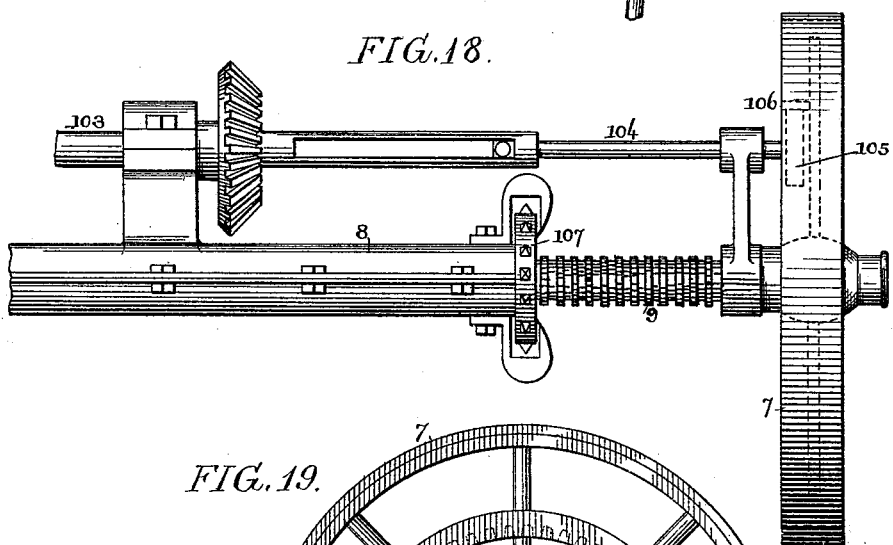
Figure 14:
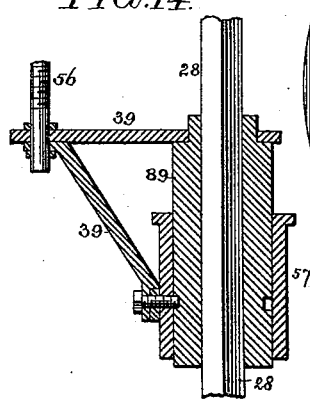
Figure 19:
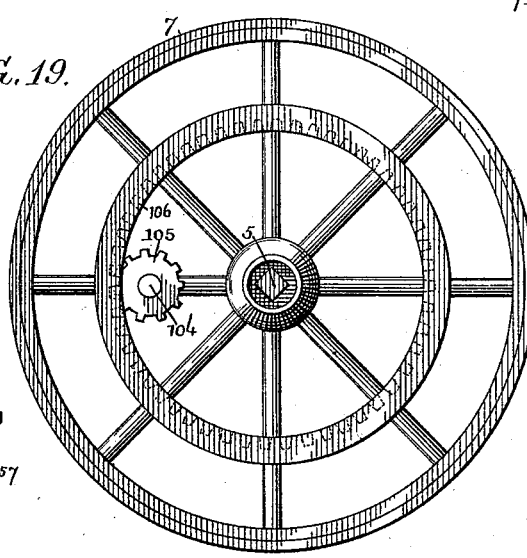
Figure 20:
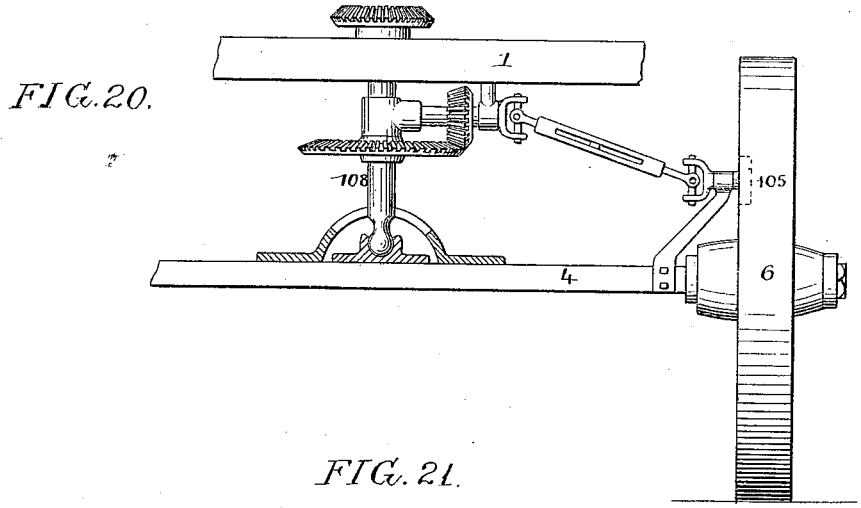
Figure 21:
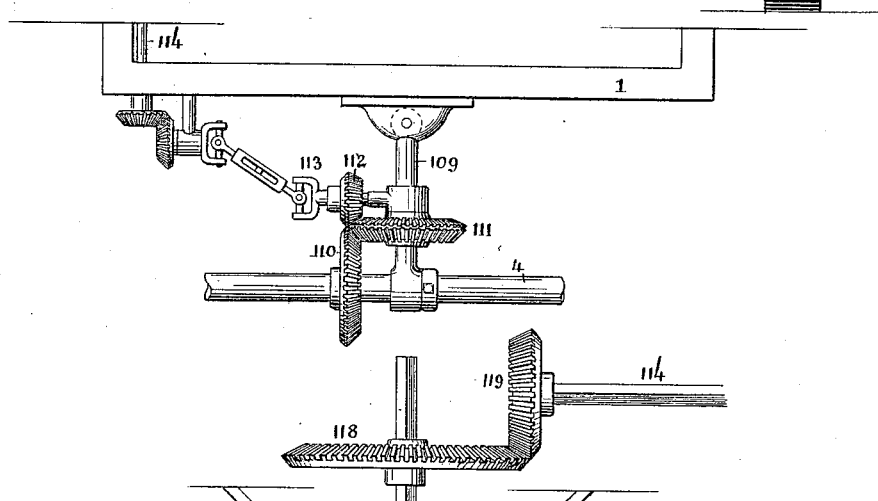
Figure 22:
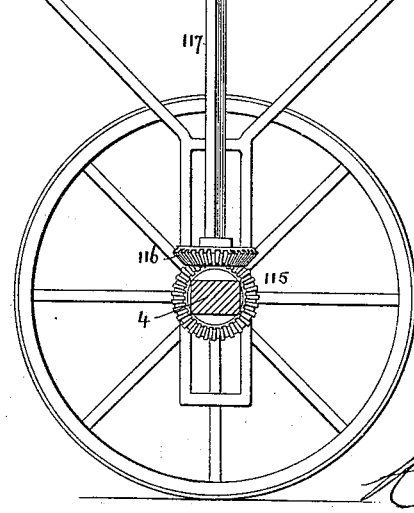

The rear axle need not necessarily be the means of transmitting power to the blade adjusting shaft. For instance, a separate shaft 103 having extensible section 104 may be mounted in front or rear of the axle proper, and may have a pinion 105 meshing with an internal rack 106 on one of the rear wheels, as shown in Figs. 18 and 19, and the axle may be adjusted by other means than the rack and pinion shown in Fig. 2. For instance, in Fig. 18 we have shown the outer sections of a non-rotating axle threaded for adaptation to a toothed nut 107 free to turn in, but confined longitudinally to, the central section 8 of the axle. When this nut is stationary there will be no longitudinal movement of the axle; but if the nut is turned in one direction or the other it will necessarily effect the expansion or contraction of the axle. The power may also be transmitted from the front wheel or axle instead of from the rear, Figs. 20, 21, and 22 showing various modifications of this idea. Thus in Fig. 20 the front axle is hung by a ball-and-socket joint to the lower end of a king-bolt shaft 108, geared by bevel-wheels and a universally-jointed and extensible shaft to a pinion 106 driven by an internal gear on one of the front wheels, the universal joints and extensible section of the transmitting shaft permitting swing of the front axle both vertically and horizontally without derangement of the gearing.

Fig. 21 shows a swinging frame 109 pivoted to the front of the fixed frame and carrying the front axle, the gearing in this case comprising a bevel-wheel 110 on the axle, double bevel-wheel 111, pinion 112, and shaft 113 on the swinging frame, and a universally jointed and extensible shaft and bevel-gears for operating a longitudinal shaft 114, adapted to bearings on the fixed frame and serving to transmit power to the adjusting devices of the blade.

Fig. 22 illustrates a still simpler arrangement, in which the front axle turns with the wheels and has a bevel-wheel 115 gearing into a bevel-pinion 116 on a shaft 117, which constitutes the king-bolt and carries a bevel-wheel 118 meshing into a pinion 119 on a longitudinal shaft 114, by which the movement is transmitted to the blade-adjusting devices of the machine.

It will be observed that in our improved machine the devices for imparting the horizontal angular adjustment to the scraping-blade are altogether within the lateral limits of or below the fixed frame of the machine, so that we are enabled to adjust the scraping-blade to a very acute angle and yet use a frame of any desired width, whereas when the devices for hanging the blade are outside of the fixed frame and extend above the same the frame must be extremely contracted in width in order to render possible any acute angle of adjustment of the blade. The mechanism which we now use, moreover, provides for direct vertical lift of the blade in all positions of horizontal angular adjustment, and the latter adjustment does not affect the vertical position of the ends of the blade, as all of the adjusting devices are operated from a common central axis, around which the blade swings in effecting the horizontal angular adjustment of the same.

The supplementary frame 33, adjustable at right angles to the longitudinal line of the main frame, provides for the lateral shifting of the scraping-blade with less lateral projection of the frame itself than is required when the frame is pivoted at the front end and swings in the arc of a circle, as the rear end of the frame in the latter case always travels to a greater extent than the actual amount of said shift imparted to the blade.

Although we have described both the devices for effecting vertical adjustment of the blade and the devices for effecting horizontal angular adjustment of the blade as being driven by power, but one set of said devices may be so driven, if desired, or all of the adjustments—that is to say, the horizontal angular adjustment, the vertical adjustment, and the pitch adjustment—may be effected by power-driven devices.

Having thus described our invention, we claim and desire to secure by Letters Patent—

1. The combination of the central or primary shaft and driving bevel wheels thereon, adjusting mechanism for the plowing or scraping blade, and a pinion forming part of said adjusting mechanism and movable into or out of engagement with said bevel wheels, substantially as specified.

2. The combination of the central or primary shaft, bevel wheels thereon, adjusting mechanism for the plowing or scraping blade, and a bevel pinion forming part of said adjusting mechanism and movable into engagement with either of said bevel wheels, or out of engagement with both of the same, substantially as specified.

3. The combination of the central or primary shaft, single and double bevel wheels thereon, adjusting mechanism for the blade having a pinion movable into or out of engagement with said bevel wheels, and a pinion engaging with the duplex bevel wheel, and driven from one of the wheels or axles of the machines, substantially as specified.

4. The combination, in a road machine, of a scraping or plowing blade constructed for horizontal angular adjustment and vertical end adjustment, and an operating shaft governing said vertical end adjustment, and located at the axis of the horizontal angular movement of the blade, all substantially as specified.

5. The combination, in a road machine, of a scraping or plowing blade constructed for horizontal angular adjustment and vertical end adjustment, and an operating shaft governing both the horizontal angular and vertical end adjustments of the blade, and located at the axis of said horizontal angular movement, as set forth.

6. The combination of a slide having a depending hanger arm, with a blade, a bracket having a pivotal connection with said blade, and a pivoted rod adapted to said hanger arm and carried by the bracket, substantially as specified.

7. The combination of the plowing or scraping blade, vertically adjustable slides having hangers forming supports for the opposite ends of said blade, and brace rods connected to the opposite ends of said blade and extending to a longitudinally pivoted ring centrally located in respect thereto, substantially as specified.

8. The combination of the plowing or scraping blade, the ring, the carriage thereon, having depending hangers forming the support for the blade, the central operating shaft, the bars extending from the blade and its carriage to said central operating shaft and forming an X-shaped brace, all substantially as specified.

9. The combination of the carrying wheels, the plowing or scraping blade, a compound operating shaft for the blade comprising concentric sections, and located axially in respect to the horizontal swing of the blade, and gears connecting said compound shaft to the blade and to the carrier wheels, substantially as specified.

10. The combination of the blade pivoted at the lower portion, with a snail, and a guided rod connected to the upper portion of the blade, and having a pin adapted to said snail, substantially as specified.

11. The combination of the blade pivoted near its lower edge, the rotated snail, and a guided rod having a pin adapted to said snail, and having connection with the upper portion of the blade constructed to permit free lateral play of the rod, substantially as specified.

12. The combination of the plowing or scraping blade, the frame of the machine, the ring mounted thereon, and having an annular worm wheel, the carriage traveling on said ring and carrying the blade and its adjusting mechanism, and a worm adapted to bearings on said carriage and engaging with the worm on the ring, an axial shaft for operating said worm, and gearing connecting the worm and shaft, substantially as described.

13. The combination of the scraping blade, with draft mechanism carrying the attachment for the team, and unconfined laterally at the draft end, whereby it is free to automatically adjust itself laterally to the varying line of draft, all substantially as specified.

14. The combination, in a road machine, of the scraping blade, with draft mechanism carrying the attachment for the team, and unconfined both laterally and vertically at the draft end, substantially as specified.

15. The combination of the draft bar, its chain, and the drums to which the ends of the same are attached, with the scraping or plowing blade, mechanism for effecting the horizontal angular adjustment of the same, and gearing for operating the drums to take up or deliver the slack of the draft chain in accordance with the horizontal angular adjustment of the blade, substantially as described.

16. The combination of the plowing or scraping blade, laterally movable on the fixed frame, with draft mechanism carrying the team-attaching devices, and laterally unconfined at the draft end, with side chains which can be attached to or detached from the draft mechanism, all substantially as specified.

17. The combination of the pinion forming part of the blade-operating mechanism of the machine, a slide controlling said pinion, and a lever connected to said slide and provided with means for securing it in different positions.

18. The combination of opposite bevel wheels forming part of the adjusting gearing of the blade of a road scraper, a pinion movable into gear with either of said wheels, or out of gear with both, a slide controlling said pinion, a lever connected to said slide, and springs acting on said lever and tending to maintain it in the intermediate position, all substantially as specified.

19. The combination of the main frame, a supplementary frame guided thereon, and adjustable at right angles to the longitudinal line of the main frame, and a scraping blade, and centrally located adjusting mechanism therefor carried by said supplementary frame, all substantially as specified.

20. The combination, in a road scraping machine, of the main frame, the supplementary frame laterally adjustable thereon, a ring mounted on said laterally adjustable frame, a carriage moving on said ring, and a blade, and adjusting devices therefor hung to said carriage, substantially as specified.

21. The combination of the blade, the ring upon which it is mounted, an adjustable frame mounted on the main frame, racks on said adjustable frame, and connected worms mounted upon the main frame of the machine and gearing into said racks, substantially as described.

22. The combination of the frame of a road machine, the rotatable rear axle composed of sections longitudinally adjustable in respect to each other and each carrying one of the wheels, a rack on each of the adjustable sections, and a pinion engaging with said rack whereby the movement of the adjustable axle sections may be effected, substantially as specified.

In testimony whereof we have signed our names to this specification in the presence of two subscribing witnesses.

FREDERICK M. PENNOCK.
GUY WEBSTER.

Witnesses:
CLEON MOORE,
JAS. W. McGARRY.